(12) United States Patent
Amaki et al.

(10) Patent No.: US 7,954,104 B2
(45) Date of Patent: May 31, 2011

(54) REMOTE COPY STORAGE DEVICE SYSTEM AND A REMOTE COPY METHOD TO PREVENT OVERLOAD OF COMMUNICATION LINES IN SYSTEM USING A PLURALITY OF REMOTE STORAGE SITES

(75) Inventors: Kensuke Amaki, Nasushiobara (JP); Kazuhiko Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1483 days.

(21) Appl. No.: 11/349,079

(22) Filed: Feb. 8, 2006

(65) Prior Publication Data
US 2007/0118840 A1    May 24, 2007

(30) Foreign Application Priority Data
Nov. 24, 2005  (JP) .................................. 2005-338333

(51) Int. Cl.
G06F 9/46 (2006.01)
G06F 13/00 (2006.01)
(52) U.S. Cl. ......... 718/103; 718/104; 718/105; 711/162
(58) Field of Classification Search .................. 718/104, 718/105; 711/162
See application file for complete search history.

(56) References Cited

U.S. PATENT DOCUMENTS

| | | | |
|---|---|---|---|
| 6,801,921 B2 * | 10/2004 | Tsuchida et al. | 707/1 |
| 2003/0229764 A1 * | 12/2003 | Ohno et al. | 711/147 |
| 2004/0103254 A1 * | 5/2004 | Satoyama et al. | 711/150 |
| 2004/0268067 A1 * | 12/2004 | Yamagami | 711/159 |
| 2005/0060505 A1 * | 3/2005 | Kasako et al. | 711/162 |
| 2005/0091448 A1 * | 4/2005 | Nakatani et al. | 711/113 |

* cited by examiner

*Primary Examiner* — Kenneth Tang
(74) *Attorney, Agent, or Firm* — Antonelli, Terry, Stout & Kraus, LLP.

(57) ABSTRACT

Overload of communication lines and the drop of through-put of task processing in a center computer is prevented. The center computer executes a plurality of task processing, writes the execution result to a center storage device and remote copies the same data to a plurality of remote storage devices. At this time, the center computer acquires loads of communication lines through load measurement portions and stops the execution of a part of the task processing involved with the transmission of the copy data through the communication line when its load exceeds a predetermined threshold value. When the center storage device and the remote storage devices switch the transmission route of the copy data to other route, the center computer starts again the execution of the task processing previously stopped and starts again the remote copy.

11 Claims, 8 Drawing Sheets

| HARDWARE IDENTIFIER | INPUT/ OUTPUT TIME | INPUT/ OUTPUT THROUGH-PUT | TRANSFER BAND | TASK IDENTIFIER | COPY TYPE |
|---|---|---|---|---|---|
| TASK A DATA | 10ms | 100 IOPS | 40MB/s | TASK A | SYNCHRONOUS + ASYNCHRONOUS |
| TASK B DATA | 5ms | 200 IOPS | 80MB/s | TASK B | SYNCHRONOUS + ASYNCHRONOUS |
| TASK C DATA | 1ms | 1000 IOPS | 100MB/s | TASK C | SYNCHRONOUS + ASYNCHRONOUS |
| PORT 23 | 10ms | 100 IOPS | 40MB/s | TASK A, B, C | ASYNCHRONOUS |
| PORT 22 | 5ms | 200 IOPS | 80MB/s | TASK A, B, C | SYNCHRONOUS |

| HARDWARE IDENTIFIER | JOURNAL IDENTIFIER | PROXIMITY CONNECTION INFORMATION | REMOTE CONNECTION INFORMATION | OTHER ROUTE CONNECTION INFORMATION | STATUS INFORMATION |
|---|---|---|---|---|---|
| TASK A DATA | JOURNAL A | UNDER TRANSFER | UNDER TRANSFER | NON-TRANSFER | EFFECTIVE |
| PORT 23 | JOURNAL C | NON-CONNECTION | UNDER TRANSFER | NON-TRANSFER | EFFECTIVE |
| TASK B DATA | JOURNAL B | UNDER TRANSFER | UNDER TRANSFER | NON-TRANSFER | EFFECTIVE |
| TASK C DATA | JOURNAL C | UNDER TRANSFER | UNDER TRANSFER | NON-TRANSFER | EFFECTIVE |
| PORT 22 | JOURNAL B | UNDER TRANSFER | NON-CONNECTION | NON-TRANSFER | EFFECTIVE |

| TASK PRIORITY | TASK IDENTIFIER | HARDWARE IDENTIFIER | LOAD UPPER LIMIT VALUE | LOAD LOWER LIMIT VALUE | COPY TYPE |
|---|---|---|---|---|---|
| C | TASK C | TASK C DATA | 50 IOPS | 500 IOPS | PROXIMITY (SYNCHRONOUS) |
| B | TASK B | PORT 22 | 8ms | 2ms | PROXIMITY (SYNCHRONOUS) |
| B | TASK B | TASK B DATA | 70 IOPS | 500 IOPS | PROXIMITY (SYNCHRONOUS) |
| A | TASK A | TASK A DATA | 150 IOPS | 500 IOPS | REMOTE (ASYNCHRONOUS) |
| C | TASK C | PORT 23 | 8ms | 2ms | REMOTE (ASYNCHRONOUS) |

FIG.8

| JOURNAL IDENTIFIER 701 | JOURNAL DATA 702 |
|---|---|
|  |  |

FIG.9

| JOURNAL IDENTIFIER | JOURNAL OF BUSINESS CENTER 901 | JOURNAL OF PROXIMITY DATA CENTER 902 | JOURNAL OF REMOTE DATA CENTER 903 |
|---|---|---|---|
| n | n (EFFECTIVE JOURNAL) | n (EFFECTIVE JOURNAL) |  |
| ⋮ |  |  |  |
| q |  |  | q |
| ⋮ |  |  | (EFFECTIVE JOURNAL) |
| m | m | m |  |
| ⋮ |  |  |  |
| p |  |  | p |

FIG.10

REMOTE COPY STORAGE DEVICE SYSTEM AND A REMOTE COPY METHOD TO PREVENT OVERLOAD OF COMMUNICATION LINES IN SYSTEM USING A PLURALITY OF REMOTE STORAGE SITES

INCORPORATION BY REFERENCE

The present application claims priority from Japanese application JP2005-338333 filed on Nov. 24, 2005, the content of which is hereby incorporated by reference into this application.

BACKGROUND OF THE INVENTION

This invention relates to a remote copy storage device system, a center computer and a remote copy method each of which is used for storing the same information as information stored in a center storage device to a plurality of remote storage devices.

Computers and their networks have now become indispensable infrastructures to support economical activities of human being. When any fault occurs in the computer as the infrastructure, therefore, great influences are exerted not only on the economic activities of companies but also on the social lives of ordinary people. Among the faults of the computers, the loss of data stored in storage devices is the most serious and critical of all. Hardware and software constituting the computer can be replaced by normal ones when any fault occurs in them but the data stored in the storage devices cannot be recovered once lost.

Therefore, to prevent the loss of data stored in the storage devices owing to a large-scale disaster such as an earthquake, a remote copy technology that installs storage devices at two sites spaced apart from each other and allows the storage devices to mutually duplicate and store the data between them at two sites has been put into practical application. Market needs of the storage devices call for a remote copy technology capable of further increasing the installation sites of the storage devices to three or more sites.

For example, US2003/0051111 A1 discloses a remote copy technology capable of always duplicating the data after the sequence of updating of data is secured among storage devices installed at three or more sites. According to this remote copy technology, even when a fault occurs in a certain storage device and the data is lost from the storage device owing to an accident, the data can be reconstituted with guaranteed sequence on the basis of the data stored in two or more other storage devices.

SUMMARY OF THE INVENTION

However, the technology disclosed in US2003/0051111 A1 does not consider an over-load of a communication load in a communication line for transmitting data from a copy origin to copy destinations when remote copy is made among three or more storage devices. It has been found that when the communication load in the communication line becomes excessive, the copy processing gets delayed and owing to this delay, the task (business) processing performance of the computer drops.

In other words, when a plurality of copy destinations exist, the data quantity transmitted from the copy origin increases in proportion to the number of copy destinations. In this case, the communication capacity of the copy origin and the transfer band of the communication line connecting the copy origin to the copy destinations are consumed by the data transmission of the remote copy, and the margins inherent to the transmission capacity of the copy origin and to the transfer band of the communication line become small. On the other hand, the quantity of data written into the storage devices with the task processing of the computer greatly changes in many cases depending on date, hour and season. Therefore, when the copy destinations of the remote copy are plural, the danger that the data quantity transmitted from the copy origin exceeds the transmission capacity of the copy origin or the transfer band of the communication line connecting the copy origin to the copy destinations is great, that is, the danger of the overload of the communication line increases.

Actually when the transmission data quantity transmitted from the copy origin exceeds the transmission capacity of the copy origin or the transfer band of the communication line connecting the copy origin to the copy destination, that is, when the communication load of the communication line connecting the copy origin to the copy destination becomes an overload, the data transfer is drastically retarded and the original performance of the computer drops or the data to be copied is lost when a fault or an accident occurs. Therefore, it is necessary to prevent the communication load of the communication line from reaching the overload but the technology described in US2003/0051111 A1 does not at all represent the counter-measure.

In view of the problems with the prior art technologies described above, it is an object of the invention to provide a remote copy storage device system, a center computer and a remote copy method each of which can prevent a communication load of a communication line connecting a center storage device (copy origin) to a remote storage device (copy destination) from becoming an overload and the drop of through-put of the task processing in the computer even when write data to a center storage device increases by task processing executed by the computer in a remote copy storage device system for storing the same information as information stored in the center storage device to a plurality of remote storage devices.

To accomplish the object described above, the invention provides a remote copy storage device system including a center computer for executing a plurality of task processing; a center storage device connected to the center computer, for storing information obtained as a result of the execution of the task processing by the center computer; and a plurality of remote storage devices connected to the center storage device through communication lines, respectively, for receiving and storing copy data transmitted by the center storage device; wherein at least one of the center computer and the center storage device has load measurement means for measuring load information of communication lines connecting the center storage device and the plurality of remote storage devices, respectively. In this remote copy storage device system, (1) the center computer (1a) acquires load information of the communication lines connecting the center storage device and the plurality of remote storage devices, respectively, (1b) extracts a communication line the acquired load information of which exceeds a predetermined threshold value as a route switch object communication line; (1c) extracts a part of task processing from among task processing relating to the copy data transmitted through the route switch object communication line so extracted; (1d) stops remote copy relating to the task processing by stopping the execution of the task processing so extracted; and (1e) reports a route switch instruction for switching the transmission route of the copy data relating to the task processing stopped to other communication line different from the route switch object communication line to the center storage device and the remote storage device. (2) The center storage device and the remote storage device receive the report of the route switch instruction and then execute processing for switching the transmission route of the copy data. (3) The center computer thereafter starts again the remote copy by starting again the execution of the task processing stopped.

As described above, the center computer according to the invention monitors the loads of the communication lines connecting the center storage device and a plurality of remote storage devices and detects the communication line which is likely to undergo the overload. Then, the center computer instructs to switch the transmission route for the information of a part of the task processing among the information transmitted by using the transmission line to the center storage device and the plurality of remote storage devices. Receiving the information, the center storage device and the remote storage device switch the communication line to the one not using the communication line that is likely to undergo overload. Therefore, this communication line is prevented from undergoing the overload because the communication load is reduced for the communication line that is likely to undergo overload. As a result, the drop of the processing performance of the center computer resulting from the overload of the communication line can be prevented.

The invention can prevent the overload of the communication load of the communication line connecting the center storage device and the remote storage device in the remote copy storage device system and can eventually prevent the drop of the task processing performance in the computer.

Other objects, features and advantages of the invention will become apparent from the following description of the embodiments of the invention taken in conjunction with the accompanying drawings.

DESCRIPTION OF THE EMBODIMENT

An embodiment of the invention will be hereinafter explained in detail with reference to the accompanying drawings, whenever necessary.

Figure 1:
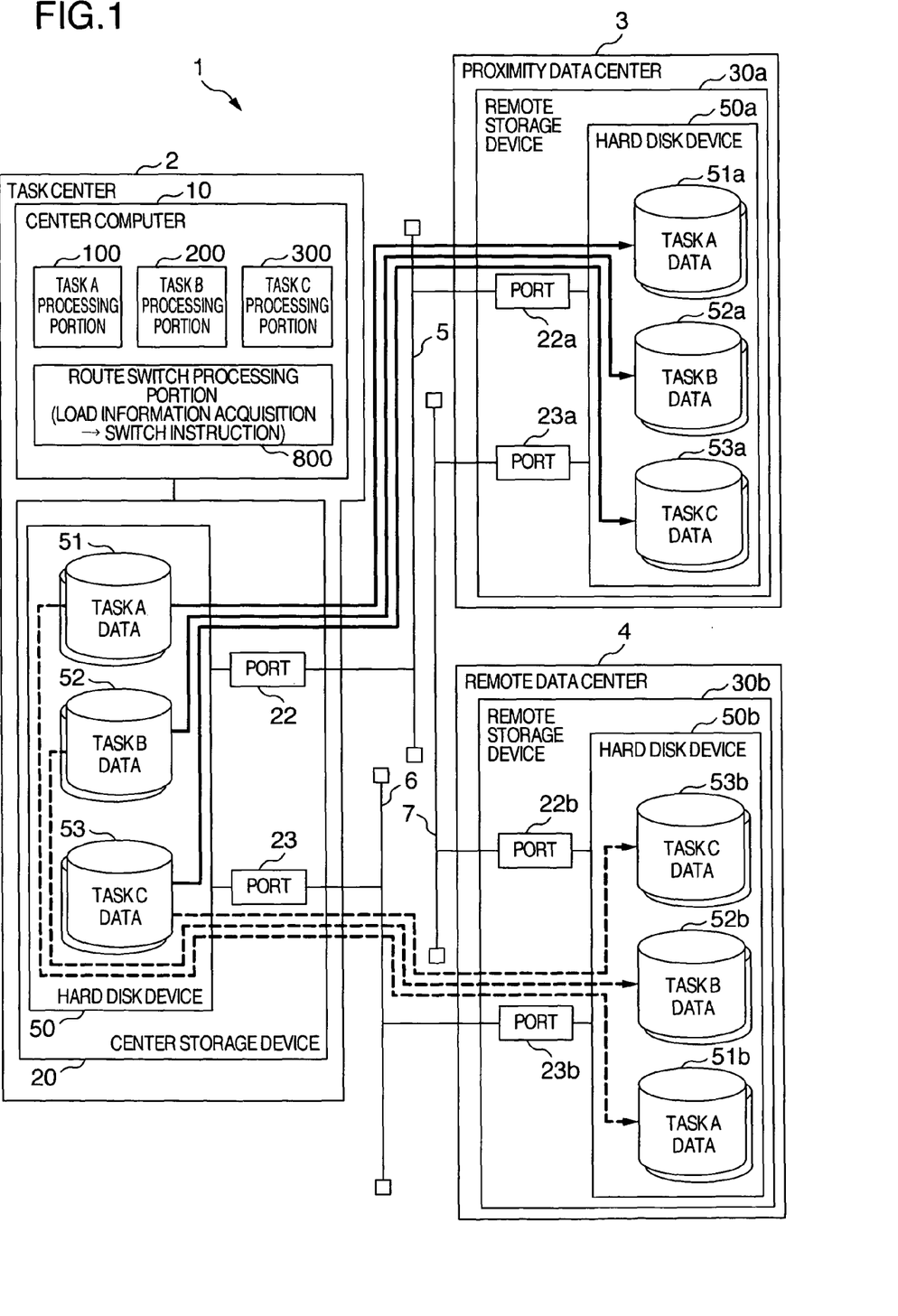
FIG. 1 shows a schematic construction of a remote copy storage device system according to an embodiment of the invention and an example of a communication route of copy data under a normal state.

To begin with, a schematic construction of a remote copy storage device system according to an embodiment of the invention and a method for preventing an overload of a communication line will be explained with reference to FIGS. 1 and 2. FIG. 1 shows a schematic construction of a remote copy storage device system according to an embodiment and an example of a transmission route of copy data under a normal condition.

The remote copy storage device system 1 includes a task center 2 in which a center computer 10 and a center storage device 20 are installed, a proximity data center 3 in which remote storage device 30a is installed and a remote data center 4 in which a remote storage device 30b is installed. The center storage device 20 and the remote storage device 30a of the proximity data center 3 are connected to each other through a communication line 5 and the center storage device 20 and the remote storage device 30b of the remote data center 4 are connected to each other through a communication line 6. The remote storage device 30a of the proximity data center 3 and the remote storage device 30b of the remote data center 4 are connected to each other through a communication line 7. At this time, each of the communication lines 5, 6 and 7 is preferably constituted by an independent optical fiber line.

Here, the proximity data center 3 is installed at a position not much spaced apart from the task center 2 (within a distance of about 10 km to about 50 km, for example) and the remote data center is installed at a position far from the task center 2 (at a position at least 100 km away, for example). More concretely, when the task center 2 exists at the center of Tokyo, for example, the proximity data center 3 is installed in Saitama City whereas the remote data center 4, in Osaka City.

Next, the construction and function of each of the center computer 10, the center storage device 20 and the remote storage devices 30a and 30b will be explained with reference to FIG. 1. However, the explanation will be given only briefly and the detailed construction and function will be given separately with reference to FIGS. 3 and 4.

To process predetermined tasks, the center computer 10 includes programs such as a task A processing portion 100, a task B processing portion 200 and a task C processing portion 300, executes these programs and writes the information so obtained as task A data 51, task B data 52 and task C data 53 to a hard disk device 50 of the center storage device 20. Incidentally, the term "task processing" used hereby means those task processes which are processed by a computer on the basis of entirely different databases such as on-line task of a bank and a bank payroll calculation task.

The center computer 10 includes a route switch processing portion 800 and acquires communication load information of the communication lines 5 and 6 for connecting the center storage device 20 to the remote storage devices 30a and 30b, respectively, through the route switch processing portion 800. The center computer 10 detects the communication line 5 (or 6) the communication load information of which exceeds a predetermined threshold value, and outputs a transmission route switch instruction to the center storage device 20 and to the remote storage devices 30a and 30b so that a part of the information transmitted from the center storage device 20 can be transmitted through other route by using the communication line 5 (or 6). Here, the term "other route" represents the communication line 7 that connects the remote storage devices 30a and 30b. The detailed processing flow of this route switch processing portion 800 will be separately explained with reference to the drawings.

The center storage device 20 includes a hard disk device 50 and stores the information that is obtained when the center computer 10 executes the programs such as the task A processing portion 100, the task B processing portion 200 and the task C processing portion 300, as task A data 51, task B data 52 and task C data 53. The center storage device 20 has ports 22 and 23 for outputting the same information (hereinafter called "copy data") as the information stored in the hard disk device 50 to the communication lines 5 and 6. In the example shown in FIG. 1, the copy data is outputted from the port 22 to the communication line 5 and is transmitted to the remote storage device 30a through the communication line 5. The same copy data is outputted from the port 23 to the communication line 6 and is transmitted to the remote storage device 30b through the communication line 6.

The remote storage device 30a includes the hard disk device 50a and furthermore, ports 22a and 23a. The remote storage device 30a receives the copy data transmitted from the center storage device 20 through the communication line 5 through the port 22a. The copy data so received is stored in the hard disk device 50a in such a fashion as to correspond to the task processing of the center computer 10 such as the task A data 51a, the task B data 52a and the task C data 53a.

Similarly, the remote storage device 30b includes the hard disk device 50b and furthermore, ports 22b and 23b. The remote storage device 30b receives the copy data transmitted from the center storage device 20 through the communication line 5 through the port 22b. The copy data so received is stored in the hard disk device 50b in such a fashion as to correspond to the task processing of the center computer 10 such as the task A data 51b, the task B data 52b and the task C data 53b.

In the remote copy storage device system 1 having the construction described above, the center computer 10 executes the programs such as the task A processing portion 100, the task B processing portion 200 and the task C processing portion 300. When the execution result is written into the center storage device 20, the copy data is written into the respective hard disk devices 50a and 50b of the remote storage devices 30a and 30b, too. A this time, the system for writing the copy data by the center computer 10 to the hard disk devices 50a and 50b of the remote storage devices 30a and 30b through the center storage device 20 and the communication lines 6 and 7, that is, the data transfer system of the remote copy, includes a synchronous system and an asynchronous system.

When the write command is generated to the storage device in the synchronous system, the center computer 10 waits for the report of write completion from the storage device and then executes the next command. Therefore, when remote copy is executed in the synchronous system, the center computer 10 waits for not only write completion of the data to the hard disk device 50 in the center storage device 20 but also write completion of the data to the hard disk devices 50a and 50b in the remote storage devices 30a and 30b at the remote copy destination.

In the asynchronous system, on the other hand, the center computer 10 executes the next command without waiting for the write completion report from the storage device when the write command is generated to the storage device. In this case, the write operation to the storage device is made somewhat belatedly with respect to the write command of the center computer 10. Therefore, when the center computer 10 executes the remote copy in the asynchronous system for the remote storage devices 30a and 30b, a difference occurs between the data stored in the hard disk device 50 of the center storage device 20 and the data stored in the hard disk devices 50a and 50b of the remote storage devices 30a and 30b.

In the remote copy in general, the data transfer of the synchronous system is made for the remote storage device 30a of the proximity data center 3 and the data transfer of the asynchronous system is made for the remote storage device 30b of the remote data center 4. Therefore, it will be assumed that the data transfer system is made by the same method in this embodiment unless specified otherwise.

The construction of the remote copy storage device system 1 that has been explained so far is based on the prior art technology disclosed in US2003/0051111 A1. It is to be noted, however, that the prior art technology involves the following two problems.

(1) When the copy data quantity transmitted from the center storage device 20 to the remote storage device 30a by the synchronous system exceeds the communication band of the communication line 5, queuing occurs in the data transmission and the time till write completion in the remote storage device 30a gets elongated. Therefore, the report of write completion to be given from the remote storage device 30a to the center computer 10 is delayed. As a result, the capacity of the center computer 10 for processing the task A processing portion 100, the task B processing portion B and the task C processing portion 300 drops because the queuing time of the center computer 10 gets elongated.

(2) When the copy data quantity transmitted from the center storage device 20 to the remote storage device 30b in the asynchronous system exceeds the communication band of the communication line 6, too, the write operation similarly gets delayed in the remote storage device 30b. In this case, the center computer 10 executes the next command without waiting for the completion of the write operation in the remote storage device 30b. Therefore, large time differences occur among the point at which the center computer 10 generates the write command to the storage device, the point at which the remote storage device 30b receives the copy data and the point at which the write operation to the hard disk device 50b is complete. When any fault occurs in the center computer 10 owing to an accident such as an earthquake in such a case, recovery of the fault becomes sometimes difficult because the center computer 10 does not hold the information as to which data is actually written to the remote storage device 30b till the write command.

In this embodiment, therefore, load measurement portions (not shown in FIG. 1 but shown in FIG. 3) for measuring the communication load are provided to the ports 22 and 23 of the center storage device 20 and measure the actual input/output time of the data and the input/output through-put to measure the communication load of the communication lines 5 and 6. When the communication load exceeds a predetermined threshold value, the transmission route is switched so that a part of the copy data transmitted through the communication lines 5 and 6 can be bypass transmitted through the communication line 7.

Figure 2:
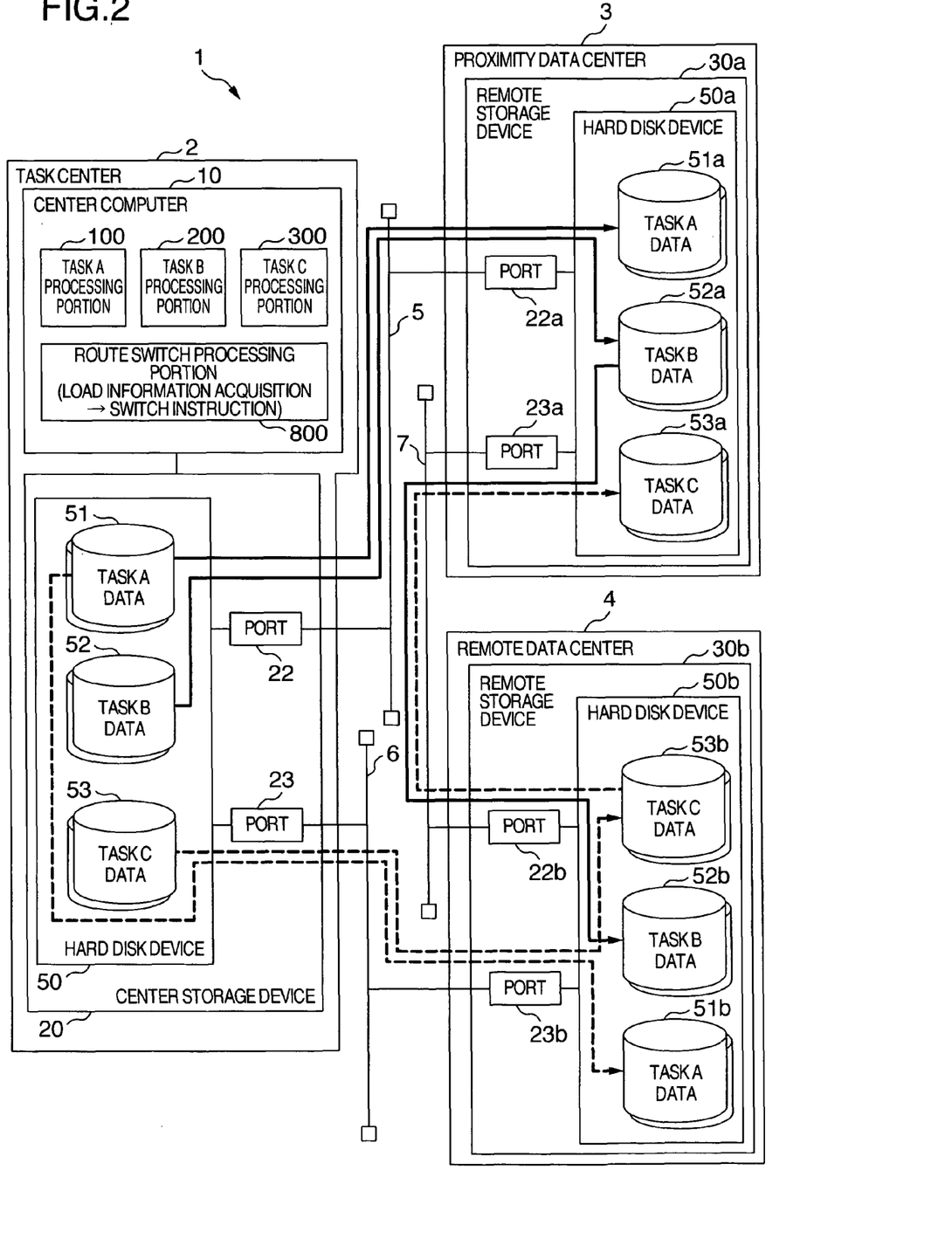
FIG. 2 shows an example of a communication route when a part of copy data is transmitted through an alternate route in the remote copy storage device system according to the embodiment of the invention.

FIG. 2 shows an example of a transmission route for bypass transmitting a part of the copy data in the remote copy storage device system according to the embodiment of the invention.

When the communication load amount exceeds the predetermined threshold value at the port 22 as shown in FIG. 2, the task A data 51 and the task B data 52 are transmitted to the remote storage device 30a through the port 22, the communication line 5 and the port 22a in the same way as before but transmission by this route is stopped for the task C data 53. At this time, the task C data 53 is transmitted on one hand to the remote storage device 30b through the port 23, the communication line 6 and the port 23b. Therefore, the remote storage device 30b writes the task C data 53 so received to the hard disk device 50b and transmits it to the remote storage device 30a through the port 22b, the communication line 7 and the port 23a. In other words, the task C data 53 is transmitted from the center storage device 20 to the remote storage device 30b and from the remote storage device 30b to the remote storage device 30a.

The remote storage device 30a can store in this way the task A data 51a, the task B data 52a and the task C data 53a in its hard disk device 50a. Since the communication load to the port 22 and the communication line 5 can be reduced in this case, the drop of the processing capacity of the center computer 10 for processing the task processing 100, 200 and 300 can be prevented.

Similarly when the communication load quantity exceeds the predetermined threshold value at the port 23, the task A data 51 and the task C data 53 are transmitted to the remote storage device 30b through the port 23, the communication line 6 and the port 23b in the same way as before but transmission by this route is stopped for the task B data 52. At this time, the task B data 52 is transmitted on one hand to the remote storage device 30a through the port 22, the communication line 5 and the port 22a. Therefore, the remote storage device 30a writes the task B data 52 so received to the hard disk device 50a and transmits it to the remote storage device 30b through the port 23a, the communication line 7 and the port 22b. In other words, the task B data 52 is transmitted from the center storage device 20 to the remote storage device 30a and from the remote storage device 30a to the remote storage device 30b.

The remote storage device 30b can store in this way the task A data 51b, the task B data 52b and the task C data 53b in its hard disk device 50b. Since the communication load to the port 23 and the communication line 6 can be reduced in this case, the time difference between the point of generation of the write command to the storage device by the center computer 10 and the point of completion of the write operation to the hard disk device 50b can be reduced for the task A data 51 and the task C data 53. As for the task B data 52, however, the time difference becomes greater, on the contrary, because the task B data 52 is unnecessarily transmitted through the remote storage device 30a. This problem is the same as the problem (2) of the prior art technology described above.

In this embodiment, therefore, each of the storage devices 2.0, 30a and 30b has a journal (not shown in FIGS. 1 and 2 but shown in FIG. 3) for recording the history of the data written into the respective hard disk device 50, 50a and 50b. The transfer route of the copy data shown in FIG. 2 can be switched by using this journal even during the task processing by the center computer 10 without spoiling the sequence of the copy data. This means also that synchronization of the journals can be made among the storage devices 20, 30a and 30b at anytime the computer may stop. Therefore, the task processing can be started again for the recovery from the fault without losing the data. The detail will be described elsewhere.

Figure 3:
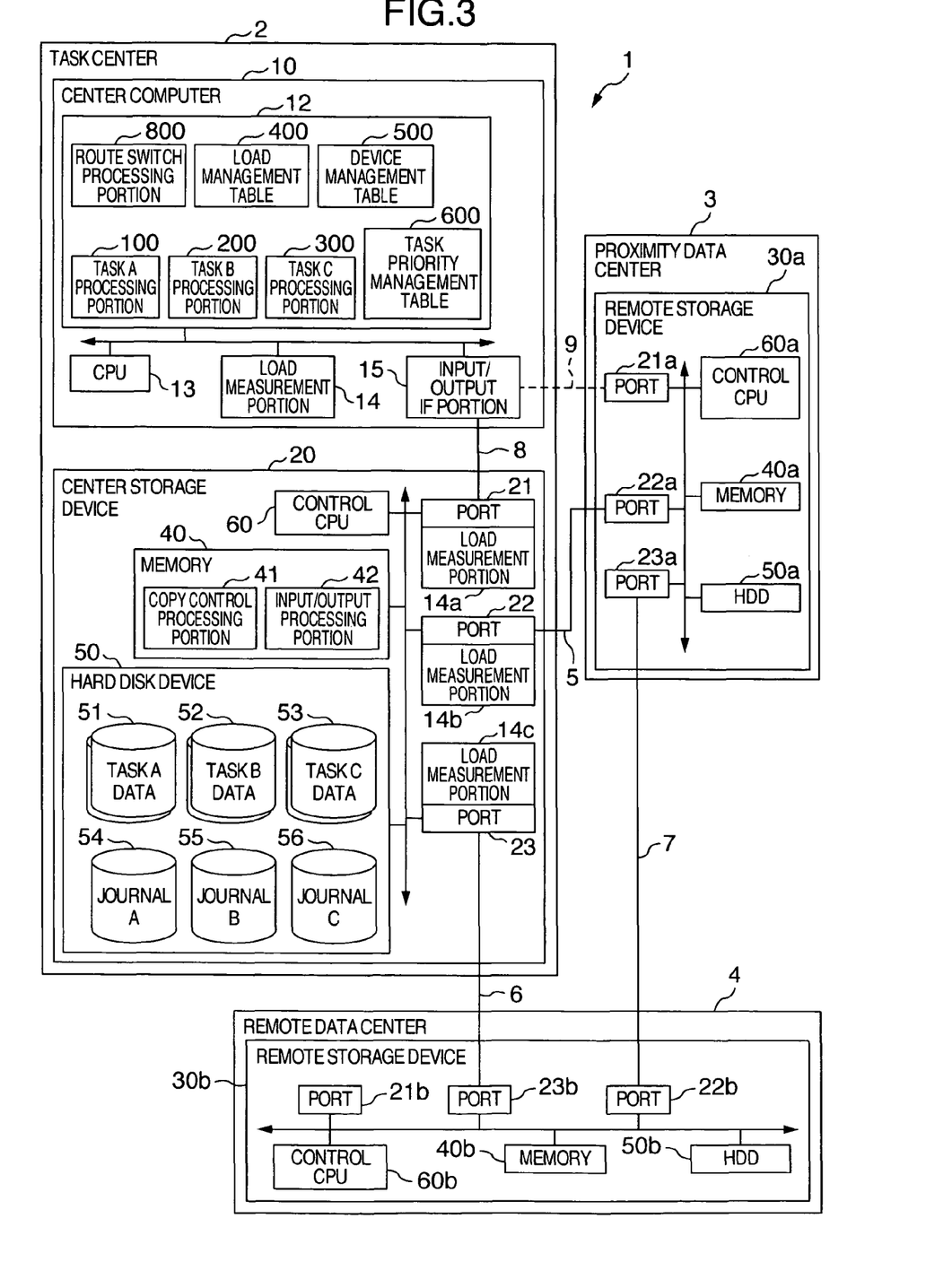
FIG. 3 shows a detailed construction of a remote copy storage device system according to the embodiment of the invention.

FIG. 3 shows a detailed construction of the remote copy storage device system according to the embodiment of the invention. The detailed explanation of the remote copy storage device system 1 will be hereinafter made. However, a part of the explanation overlapping with the explanation of FIGS. 1 and 2 will be omitted.

The remote copy storage device system 1 includes a task center 2 in which a center computer 10 and a center storage device 20 are installed and a proximity data center 3 and a remote data center 4 in which remote storage devices 30a and 30b are installed, respectively.

The center computer 10 includes a CPU (Central Processing Unit) 13, a memory 12, a load measurement portion 14 and an input/output IF (Interface) portion 15. Here, the memory 12 is a so-called "main storage device" of the computer and is constituted by a semiconductor memory. The memory 12 stores programs such as a task A processing portion 100, a task B processing portion and a task C processing portion 300 for the computer 10 to process predetermined tasks. The memory 12 further stores a program of the route switch processing portion 800 the outline of which has been explained with reference to FIG. 2. In addition, a load management table 400, a device management table 500 and a task priority management table 600 that are used for executing the program of the route switch processing portion 800 are provided to the memory 12.

The CPU 13 executes the programs stored in the memory 12 such as the task A processing portion 100, the task B processing portion 200, the task C processing portion 300 and the route switch processing portion 800 and predetermined functions are materialized. The functions materialized by the route switch processing portion 800 and the content of its processing will be later described.

The input/output IF portion 15 is connected to the center storage device 20 and to the remote storage device 30a of the proximity data center 3 through the communication lines 8 and 9, the data to be read and written are inputted to and outputted from the storage devices 20 and 30a and control data is outputted. The load measurement portion 14 is so disposed as to be accessorial to the input/output IF portion 15 and measures the load information relating to the input/output of the input/output IF portion 15 such as the required time of the input/output operation in the input/output IF portion 15 and the number of times of input/output operations per unit time (input/output through-put).

The center storage device 20 includes a control CPU 60, a memory 40, a hard disk device 50, ports 21, 22 and 23 and load measurement portions 14a, 14b and 14c. Here, the memory 40 uses a semiconductor memory and stores programs such as a copy control processing portion 41 and an input/output processing portion 42 besides the program for controlling the center storage device 20 itself. These programs are executed by the control CPU 60 and the predetermined functions contained in the center storage device 20 can be accomplished.

The hard disk device 50 is a large capacity storage device that is often constituted by a plurality (large number) of hard disk drives. The hard disk device 50 stores the data as the result of execution of the task A processing portion 100, the task B processing portion 200 and the task C processing portion 300 by the center computer 10 in such a fashion as to correspond to the respective programs such as the task A data 51, the task B data 52 and the task C data 53, respectively. When the data such as the task A data 51, the task B data 52 and the task C data 53 are written, the hard disk device 50 stores their history data relating to this write operation as the journal A 54, the journal B 55 and the journal C 56.

The ports 21, 22 and 23 are connected to the communication line 8 with the input/output IF portion 15 of the center computer 10 or to the communication lines 5 and 6 connecting the remote storage devices 30a and 30b and exchanges data transmission and reception with the center computer 10 and the remote storage devices 30a and 30b through these communication lines 8, 5 and 6. The load measurement portions 14a, 14b and 14c are so disposed as to be accessorial to the ports 21, 22 and 23, respectively, and measure the load information of the input/output such as through-put of the input/output operations at the respective ports 21, 22 and 23.

Figure 4:
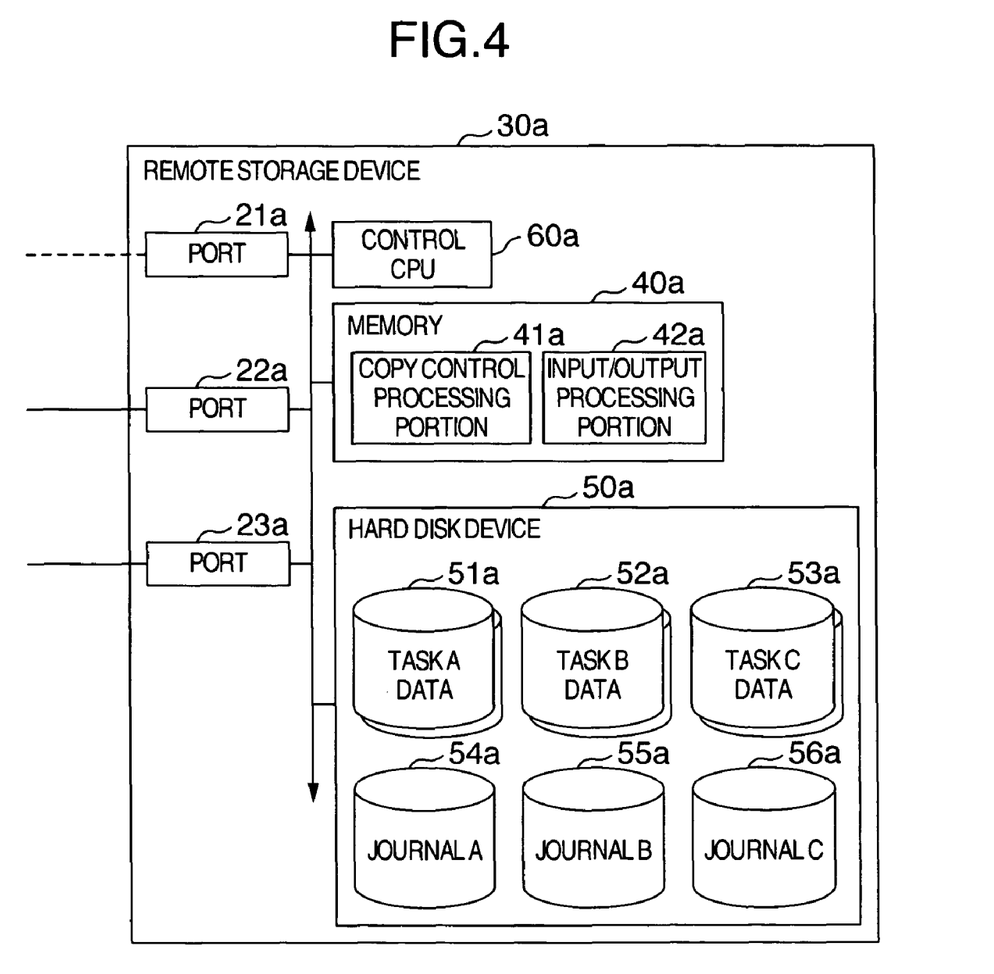
FIG. 4 shows a construction of a remote storage device according to the embodiment.

FIG. 3 shows the schematic constructions of the remote storage device 30a installed in the proximity data center 3 and the remote storage device 30b installed in the remote data center 4, respectively, and FIG. 4 shows their detailed constructions. The remote storage device 30a and the remote storage device 30b have the same basic construction as can be appreciated from FIG. 3. The center storage 20 has substantially the same construction, too, but the load measurement portions are not accessorial to the ports 21a, 22a, 23a, 21b, 22b and 23b in the case of the remote storage devices 30a and 30b.

FIG. 4 shows the construction of the remote storage device according to this embodiment. The remote storage device 30a includes a control CPU 60a, a memory 40a, a hard disk device 50a and ports 21a, 22a and 23a. Here, the memory 40a is a semiconductor memory and stores programs such as a copy control processing portion 41a and an input/output processing portion 42a besides a program for controlling the remote storage device 30a itself. These programs are executed by the control CPU 60a and predetermined functions contained in the remote storage device 30a can be materialized.

The hard disk device 50a stores the data as the result of execution of the task A processing portion 100, the task B processing portion 200 and the task C processing portion 300 by the center computer 10 and transmitted by the center storage device 20 in such a fashion as to correspond to the respective programs such as the task A data 51a, the task B data 52a and the task C data 53a, respectively. When the data such as the task A data 51a, the task B data 52a and the task C data 53a are written, the hard disk device 50a stores their history data relating to this write operation as the journal A 54a, the journal B 55a and the journal C 56a.

The ports 21a, 22a and 23a are connected to the communication lines 9, 5 and 7 connecting to the center computer 10, the center storage device 20 or other remote storage device 30b and exchange data transmission and reception with the center computer 10, the center storage device 20 and other remote storage device 30b through these communication lines.

Incidentally, explanation of the construction of the remote storage device 30b will be omitted because it is fundamentally the same as the construction of the remote storage device 30a explained above.

Figure 6:
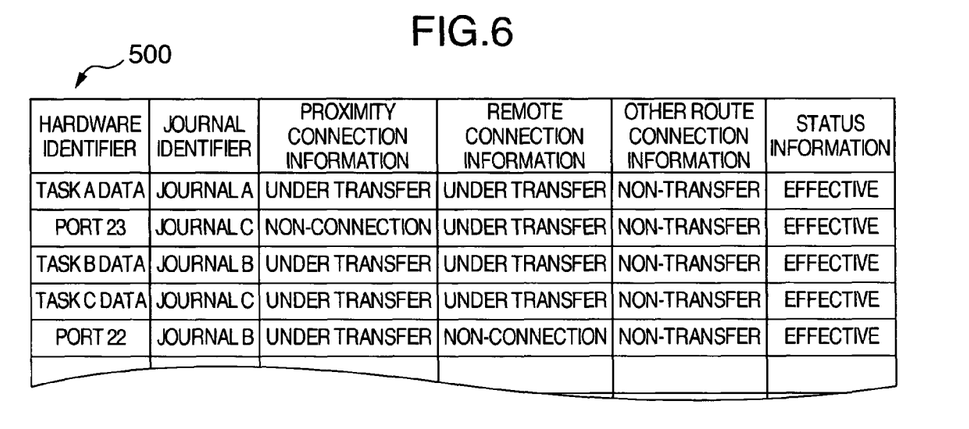
FIG. 6 shows an example of a construction of a device management table in the center computer according to the embodiment of the invention.
Figure 7:
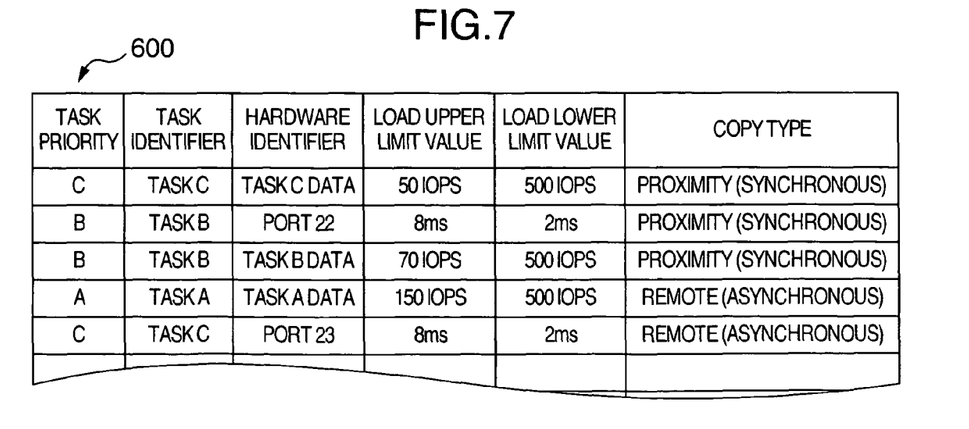
FIG. 7 shows an example of a construction of a task priority management table in the center computer according to the embodiment of the invention.

Subsequently, the function materialized by the program of the route switch processing portion 800 of the center computer 10 and the detail of its processing flow will be explained with reference to FIGS. 5 to 11 and FIG. 3. Here, FIGS. 5, 6 and 7 show an example of constructions of the load management table 400, the device management table 500 and the task priority management table 600 used by the route switch processing portion 800, respectively.

Figure 5:
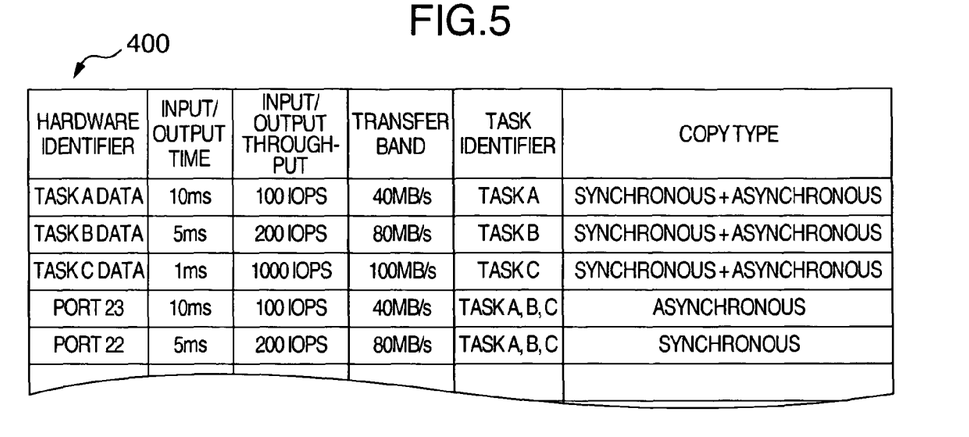
FIG. 5 shows an example of a construction of a load management table in a center computer according to the embodiment of the invention.

As shown in FIG. 5, the load management table 400 includes fields such as a hardware identifier, an input/output time, an input/output through-put, a transfer band, a task identifier and a copy type.

Here, the hardware identifier is identification information allocated uniquely to the device as the load measurement object. In this embodiment, the load measurement is made by the load measurement portions 14a, 14b and 14c of the center storage device 20 and is additionally made by the load measurement portion 14 of the center computer 10. When the load measurement is made by the load measurement portions 14a, 14b and 14c, the device as the load measurement object is the ports 21, 22 and 23. When the load measurement is made by the load measurement portion 14, the load measurement is made dividedly for each task processing such as the task A processing portion 100, the task B processing portion 200 and the task C processing portion 300. In this case, therefore, the storage destination of the data by each task processing portion 100, 200, 300 is allowed to correspond to the hardware identifier.

The input/output time is a required input/output time per input/output operation at the input/output IF portion 15 or at the ports 21, 22 and 23. The input/output through-put is the number of times of input/output executions per unit time at the input/output IF portion 15 for at the ports 21, 22 and 23. The transfer band is a data transfer amount per unit time at the input/output IF portion 15 or at the ports 21, 22 and 23. All of these kinds of information are data that are directly affected by the communication load of the communication lines 8, 5 and 6 connected to the ports 21, 22 and 23. In other words, when the communication load of the communication lines 8, 5 and 6 becomes great (when the communication lines are congested), the input/output required time gets elongated, the input/output through-put drops and the transfer band becomes small. Therefore, this embodiment represents the communication load by the data containing at least one of the input/output time, the input/output through-put and the transfer band. However, the communication load becomes greater when the input/output time becomes longer and becomes also greater when the input/output throughput and the transfer band are smaller. Incidentally, the center computer 10 acquires these kinds of information in a predetermined time interval (1 second or 1 minute, for example) from the load measurement portions 14, 14a, 14b and 14c and stores them in the load management table 400.

The task identifier is information instructing the task processing with which the device designated by the field of the hardware identifier is involved. The copy type is information representing for what kind of data transfer (synchronous system/asynchronous system, proximity connection/remote connection/other route connection) the same device is used. Incidentally, these kinds of information are set in advance by the operator.

Next, the device management table 500 includes fields such as hardware identifier, journal identifier, proximity connection information, remote connection information, other route transfer information and status information.

Here, the hardware identifier is the same as the hardware identifier explained with reference to FIG. 5. The journal identifier is the information that instructs the journal with which the device designated by the field of the hardware identifier is involved. In other words, it is possible to judge by the journal identifier copy of which data is being made.

The proximity connection information is the information representing the status in which the center storage device 20 is connected to the remote storage device 30a of the proximity data center 3 through the device designated by the field of the hardware identifier. The remote connection information is the information representing the status in which the center storage device 20 is connected to the remote storage device 30b of the remote data center 4 through the device designated by the field of the hardware identifier. The other route connection information is the information representing the status in which the remote storage device 30a of the proximity data center 3 and the remote storage device 30b of the remote data center 4 are connected. The connection status includes "under transfer", "temporary stop", "non-transfer" and "non-connection". The status information is the information representing the operation condition of the device. When the transfer task is stopped though the device exists, this information represents "invalid".

Next, the task priority management table 600 includes fields such as task priority, task identifier, hardware identifier, load upper limit value, load lower limit value and copy type as shown in FIG. 7. The information to be stored in this table is set in advance by the operator in accordance with the instruction of the user.

Here, the task identifier is the information for identifying each business processing such as the task A processing portion 100, the task B processing portion 200 and the task C processing portion 300. The task priority is the information that represents priority of each task processing. In the example shown in FIG. 7, "A" has high priority and "C", low priority.

The load upper limit value is the threshold value of the upper limit of the communication load. When the communication load exceeds this threshold value, the status of the copy type is changed to reduce the communication load. In this embodiment, the data of the task designated by the task identifier transferred by the device designated by the hardware identifier is transferred through other route. The load lower limit value is the threshold value of the lower limit of the communication load. When the communication load becomes smaller than this threshold value, the copy type changed is once returned to the original type. The field of the copy type designates the portion of the object for which the copy type is changed. Incidentally, when the communication load is expressed by the input/output through-put or the transfer band, a small value represents the load upper limit value and a large value does the load lower limit value.

Next, synchronization of the journals will be explained with reference to FIGS. 8 and 9. Here, FIG. 8 shows an example of the construction of the journal as data write history information in the storage device according to the embodiment.

Figure 8:
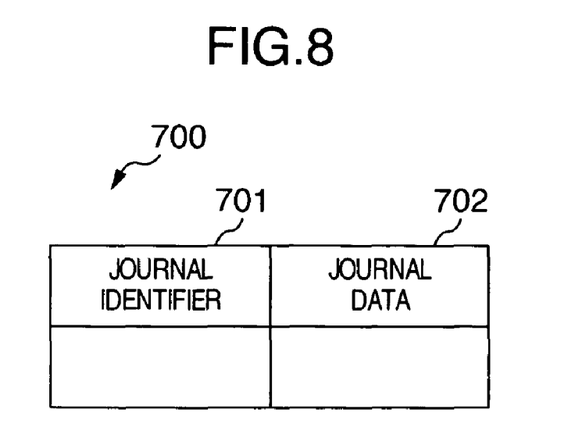
FIG. 8 shows an example of a construction of a journal as history information of a data write operation in a storage device according to the embodiment of the invention.

The journal 700 includes a journal identifier 701 and journal data 702 as shown in FIG. 8. Data write history information (log information) to the hard disk devices 50, 50a and 50b is recorded to the field of the journal data 702. The journal identifier 701 is identification information for uniquely identifying the journal data 702. The journal identifier 701 is also the information for securing sequence of the data written to the hard disk devices 50, 50a and 50b inside the same storage device 20, 30a, 30b. Therefore, identification information having sequence such as a serial number or information of year, month, day, hour, minute and second.

Incidentally, identification information having sequence is imparted by the center computer 10 or the center storage device 20 to the journal identifier 701, and the journal identifier 701 to which the identification information is so imparted is put to the copy data and is transmitted from the center storage device 20 as the copy origin to the remote storage devices 30a and 30b as the copying destinations. The journal identifier 701 is used for identifying the journal data 702 among a plurality of different storage devices 20, 30a and 30b.

The journal 700 is prepared for each task processing 100, 200, 300 in each storage device 20, 30a, 30b as already described and is stored as journal A54, 54a, . . . , journal B54, 54a, . . . , in each hard disk device 50a, 50b, 50c (see FIG. 3). The number of journal data respectively stored at this time is at most about 10 to about 20.

It will be assumed hereby that the copy data is transmitted by the synchronous system to the remote storage device 30a of the proximity data center 3 and is transmitted by the asynchronous system to the remote storage device 30b of the remote data center 4. Generally, write of the copy data to the hard disk device 50b in the remote storage device 30b is retarded. Therefore, when both hard disk devices 50a and 50b are compared at a certain predetermined timing, their contents do not coincide with each other. Therefore, to re-start the processing after the abrupt stop of the center computer 10 due to an accident or after the stop of the business process for the change of the copy route to be next described, the contents of the hard disk devices 50a and 50b must be synchronized. The journal 700 is used for this synchronization.

Figure 9:
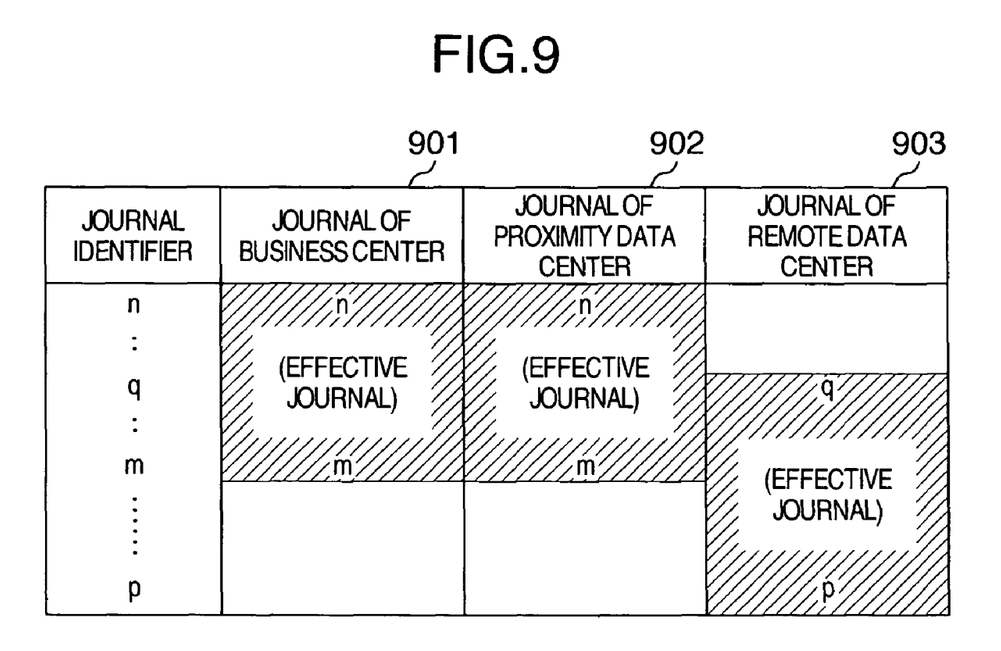
FIG. 9 shows an example of the status of the journal stored in each storage device when remote copy of certain task processing is temporarily stopped in the storage devices in the embodiment of the invention.

FIG. 9 shows an example of the condition of the journal stored in each storage device when certain task processing is temporarily stopped in the storage device according to this embodiment. As shown in FIG. 9, the journal 901 and the journal 902 respectively stored in the center storage device 20 of the task center 2 and the remote storage device 30a of the proximity data center 3 to which the copy data is transmitted by the synchronous system are coincident with each other. In other words, in the journal 901 of the task center 2 and the journal 902 of the proximity data center 3, the journal identifiers have journals of "n" to "m". Here, it will be assumed that "n" is identification information representing that it is newer than "m". Referring to FIG. 9, the effective journal is the journal that is under the storage state as the effective information in each storage device 20, 30a, 30b.

On the other hand, between the center storage device 20 of the task center 2 and the remote storage device 30b of the remote data center 4 to which the copy data is transmitted in the asynchronous system, the journal 901 and the journal 903 stored in each of them are not coincident. In other words, in the journal 901 of the task center 2, the journal identifier has journals of "n" to "m" but in the journal 903 of the remote data center 4, the journal identifier has journals of "q" to "p". Here, "q" is identification information representing that it is newer than "p".

When "q" is the identification information representing that it is newer than "m" (inclusive of the case where "q" and "m" are equal), the journal 901 of the task center 2 and the journal 903 of the remote data center 4 have the common journal data 902. In this case, journal data ranging from the journal data having the journal identifier "n" to the journal data having the journal identifier which is newer by one than "q" are transmitted from the center storage device 20 of the task center 2 or the remote storage device 30 of the proximity data center 3 to the remote storage device 30b of the remote data center 4. In consequence, the journal 903 of the remote data center 4 can be synchronized with the journal 901 of the task center 2.

On the other hand, when "q" is the identification information representing that it is older than "m", the journal 901 of the task center 2 and the journal 903 of the remote data center 4 do not have the common journal 702. In this case, since data continuity cannot be insured between the journal data having the journal identifier "m" and the journal data having the journal identifier "q", the journal 903 of the remote data center 4 cannot be synchronized with the journal 901 of the task center 2.

Next, the procedure for reducing the communication load of the communication route to which a large communication load is applied when the center computer 10 switches the communication route of the copy data will be explained with reference to FIGS. 3, 10 and 11. Here, FIG. 10 shows an example of the processing flow of the route switch processing portion 800 in the center computer 10 according to the embodiment.

Figure 10:
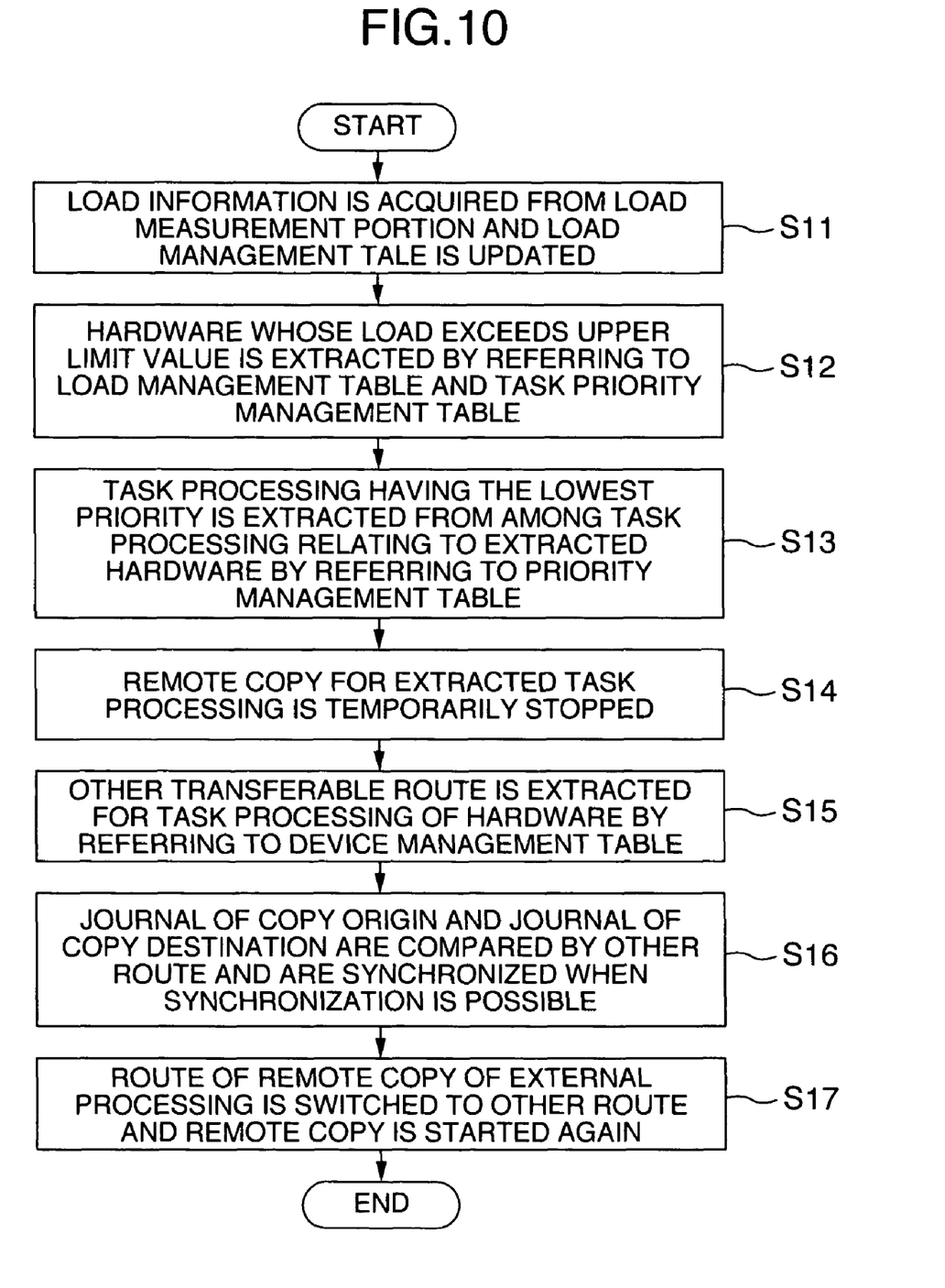
FIG. 10 shows an example of a processing flow of a route switch processing portion in the center computer according to the embodiment of the invention.

Referring to FIG. 10, the center computer 10 acquires in a predetermined time interval (one second or one minute, for example) the load information from the load measurement portions 14, 14a, 14b and 14c and updates the information of the load management table 400 information so acquired (Step S11). The load information acquired at this time is the information that contains at least one of the input/output time, the input/output through-put and the transfer band at the input/output IF portion 15 and the ports 21, 22 and 23.

Next, the center computer 10 refers to the load management table 400 and the task priority management table 600 and extracts the hardware the load of which exceeds the upper limit value (Step S12). Here, the load is the input/output time and the input/output through-put in the load management table 400 or the measurement data of the transfer band. The upper limit value is the value designated by the task priority management table 600. The hardware is the constituent element that is designated by the hardware identifier of the task priority management table 600.

Next, the center computer 10 refers to the task priority management table 600 and extracts the task processing having the lowest priority among the task processing with which the hardware extracted in Step S12 is involved (Step S13). The center computer 10 temporarily stops the execution of the task processing extracted, that is, the remote copy (Step S14).

The center computer 10 then refers to the device management table 500 and extracts other transferable route for the task processing (task processing extracted in Step S14) of the hardware (hardware extracted in Step S13) (Step S15). In this embodiment, the term "other route" represents the route that does not pass through the ports 21, 22 and 23 of the center storage device 20 but connects the remote storage devices 30a and 20b to one another. When the other route connection information of the hardware is "non-transfer" in the device management table 500, other route is judged as being transferable. When the transferable other route does not exist, the flow returns to Step S13, the task processing having the next low priority is extracted and Steps S14 and S15 are executed.

Next, the center computer 10 refers to the journals relating to the task processing (task processing extracted in Step S14) from the remote storage devices 30a and 30b as the copying device and the copying destination device of other route extracted in Step S15, compares the journals and synchronizes them if synchronization of the journals is possible (Step S16). The detailed processing flow of this processing will be later explained with reference to FIG. 1 but its basic concept has already been explained with reference to FIG. 9.

When the center computer 10 makes synchronization of the journals in Step S16, it switches the route of the remote copy of the task processing (task processing extracted in Step S15) to other route (other route extracted in Step S15) and starts again the remote copy for the task processing that is temporarily stopped in Step S14 (Step S17). Incidentally, when synchronization of the journals cannot be made, the remote copy for the task processing is started again without switching the route of the remote copy.

In the explanation given above, the center computer 10 switches the route of the remote copy to other route (Step S17). In practice, however, it is only necessary for the center computer 10 to put the information of the remote storage device 30a (or 30b) as the copying deice and the copy destination device and the information of the task processing as the switch object to the center storage device 20 or the remote storage device 30a (or 30b) and to transmit the report instructing the route switch of the remote copy. In other words, receiving the report instructing the route change, the center storage device 20 or the remote storage device 30a (or 30b) decides to transmit which copy data of which task processing to which remote storage device by using which port and through which communication line, and transmits the copy data on the basis of the route so decided.

As for synchronization of the journals (Step S17), too, it is only necessary for the center computer 10 to likewise judge whether or not synchronization can be made and to transmit the report instructing synchronization of the journals to the center storage device 20 or the remote storage device 30a (or 30b) as the object of synchronization when synchronization is possible. In other words, the center storage device 20 or the remote storage device 30a (or 30b) receiving the report instructing synchronization of the journals exchanges the journal data necessary for mutual synchronization and synchronizes both journals.

When the communication load measured at the ports 21, 22 and 23 exceeds the predetermined upper limit value (threshold value) the center computer 10 can switch in the manner described above the route of the remote copy for the data of the task processing having low priority to other route. Because transmission of the copy data of the task processing having low priority can be switched to other route, the communication load of the original communication route whose communication load exceeds the predetermined upper limit value (threshold value) can be reduced. Which communication route is concretely changed in which way has already been explained with reference to FIG. 2.

When the communication load of the original communication route is reduced below the load lower limit value of the task priority management table 600, the transmission route of the copy data of the task processing that has been switched to other route can be returned to the original route. Explanation will be omitted because the processing flow is analogous to the processing flow explained with reference to FIG. 10.

Figure 11:
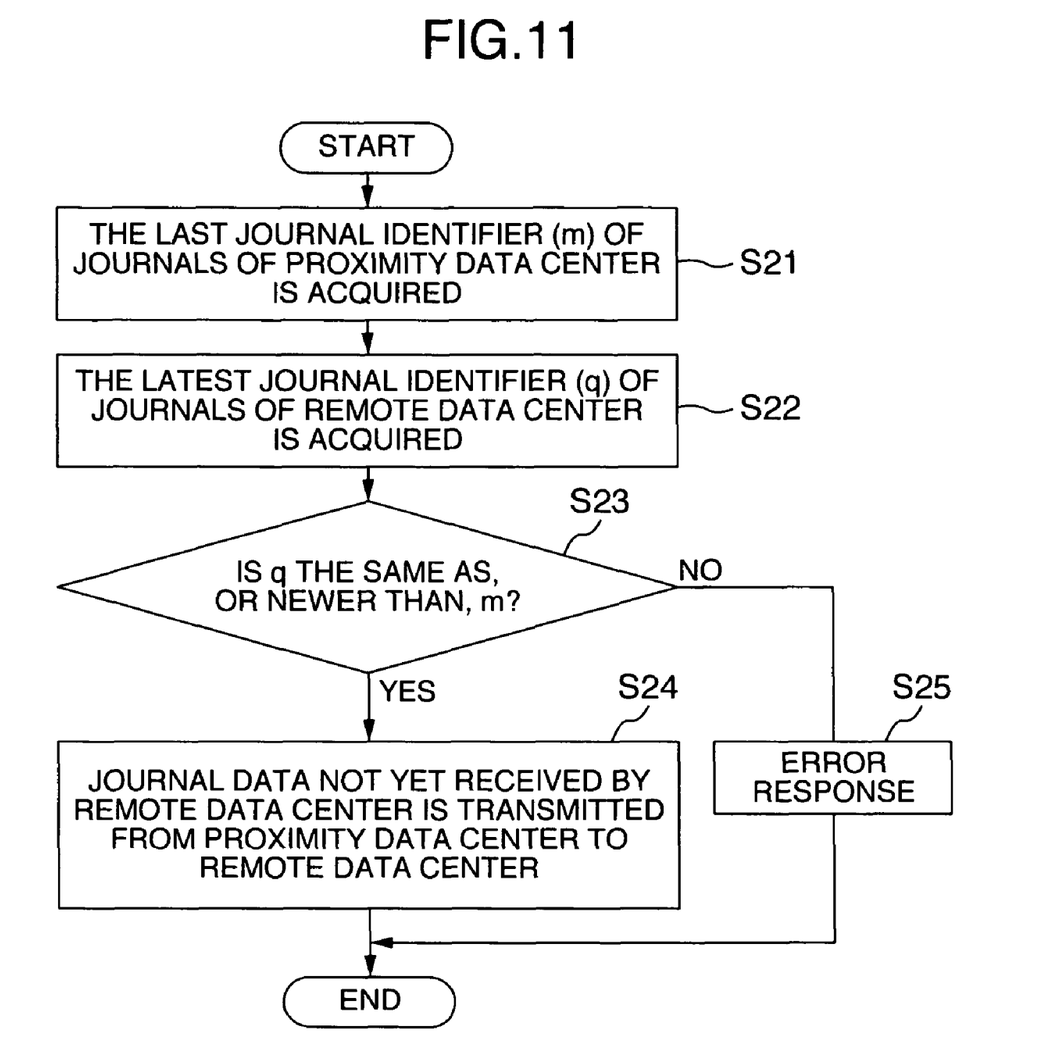
FIG. 11 shows an example of a detailed processing flow of a synchronization processing of the journal contained in the route switch processing portion in the center computer according to the embodiment of the invention.

FIG. 11 shows an example of a detailed processing flow of the synchronization processing (Step S16) of the journals contained in the route switch processing portion 800 in the center computer 10 according to the embodiment. The basic concept of this processing flow is based on the explanation shown in FIG. 9. In this embodiment, the term "other route" represents the communication line 7 connecting the remote storage device 30a of the proximity data center 3 and the remote storage device 30b of the remote data center 4. Here, the processing flow shown in FIG. 11 is based on the assumption that the first remote copy is made to the remote storage device 30a of the proximity data center 3 by the synchronous system and to the remote storage device 30b of the remote data center 4 by the asynchronous system.

In FIG. 11, the center computer 10 first acquires the last journal identifier (hereby represented as "m") of the journal relating to the task data of the task processing (task processing extracted in Step S13 in FIG. 10) from the remote storage device 30a of the proximity data center 3 (Step S21). Similarly, the center computer 10 acquires the latest journal identifier (hereby represented as "q") of the journal relating to the task data of the task processing (task processing extracted in Step S13 in FIG. 10) from the remote storage device 30b of the remote data center 4 (Step S22).

Next, the center computer 10 compares the time sequence relation between the journal identifier "m" and the journal identifier "q" and judges whether the journal identifier "q" is the same as, or newer than, the journal identifier "m" (Step S23). When the journal identifier "q" is the same as or newer than the journal identifier "m" as the result of comparison (Yes in Step S23), synchronization of journals is possible and the center computer 10 therefore transmits the report instructing synchronization of the journals to the remote storage device 30a of the proximity data center 3 and to the remote storage device 30b of the remote data center 4. Receiving this report, the remote storage device 30a of the proximity data center 3 transmits the journal data that is not received by the remote storage device 30b of the remote data center 4 to the remote storage device 30b of the remote data center 4 (Step S24). Receiving this journal, the remote data center 4 can synchronize the journal relating to the task data of the task processing with that of the proximity data center 3.

On the other hand, when the journal identifier "q" is older than the journal identifier "m" (No in Step S23), the error response representing that synchronization of the journals cannot be made is returned (Step S25) and the processing is completed.

According to the embodiment described above, transmission of the remote copy data can be switched to other route, that is, transmission through the route of the communication line between the remote storage devices 30a and 30b, before the communication load of the communication line connecting the center storage device 20 and the remote storage device 30a, 30b becomes the overload during the remote copying operation, too, without spoiling the sequence of the copy data. It is therefore possible to prevent the drop of the task processing in the center computer 10 resulting from the overload of the communication line.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A remote copy storage device system including:
   a center computer for executing a plurality of task processing;
   a center storage device connected to said center computer, for storing information obtained as a result of execution of said task processing by said center computer; and
   a plurality of remote storage devices connected to said center storage device through a plurality of communication lines, respectively, for receiving and storing copy data transmitted by said center storage device;
   wherein at least one of said center computer and said center storage device includes a load measurement module for measuring load information of each of the plurality of communication lines connecting said center storage device and said plurality of remote storage devices, respectively;
   said center computer is configured to acquire load information of said communication lines connecting said center storage device and said plurality of remote storage devices, respectively; to extract, among said plurality of communication lines, one of the communication lines, if it is determined by the load measurement module that the acquired load information of the one of the communication links exceeds a predetermined threshold value, as a route switch object communication line; to extract a part of task processing from among task processing relating to the copy data transmitted through the one of the communication lines extracted as said route switch object communication line ; to stop execution of the extracted part of task processing to stop the remote copy relating to the extracted part of task processing; and to report a route switch instruction for switching the transmission route of the copy data relating to the extracted part of the task processing to an other one of the communication lines different from said route switch object communication line to said center storage device and said remote storage device;
   said center storage device and said remote storage device are configured to receive the report of said route switch instruction and then execute processing for switching the transmission route of said data;
   said center computer is configured to start execution of the extracted part of task processing to restart the remote copy, and
   said center computer includes a task priority management table for use in determining priority of task processing, said task priority management table including fields of task priority, task identifiers, hardware identifiers, load upper limit values, load lower limit values and copy type.

2. The remote copy storage device system as defined in claim 1, wherein said center storage device and said remote storage device respectively includes journals for storing history information of write operations of information to their own, and said center computer is configured to synchronize the journal of said remote storage device with the journal of said center storage device when reporting said route switch instruction to said center storage device and to said remote storage device, and then to report said route switch instruction.

3. The remote copy storage device system as defined in claim 1, wherein said center computer is configured to serially extract task processing having lower priority set in advance to the task processing when extracting a part of the task processing from among the task processing relating to the copy data transmitted through said route switch object communication line extracted.

4. The remote copy storage device system as defined in claim 1, wherein said other communication line different from said route switch object communication line is a communication line that connects said remote storage device connected and said route switch object communication line and other remote storage device different from said remote storage device.

5. A center computer used for a remote copy storage device system including:
   said center computer for executing a plurality of task processing;
   a center storage device connected to said center computer, for storing information obtained as a result of execution of said task processing by said center computer; and
   a plurality of remote storage devices connected to said center storage device through a plurality of communication lines, respectively, for receiving and storing copy data transmitted by said center storage device;
   wherein load information of communication lines connecting respectively said center storage device and said plurality of remote storage devices is acquired through a load measurement module for measuring load information of each of the communication lines provided to said center storage device and said plurality of remote storage devices;
   among said plurality of communication lines, if it is determined by the load measurement that the acquired load information of one of the communication lines exceeds a predetermined threshold value, said one communication line is extracted as a route switch object communication line;

a part of task processing is extracted from among task processing, said part of task processing relating to the copy data transmitted through the one of the communication lines extracted as said route switch object communication line;

execution of the extracted part of task processing is stopped to thereby stop the remote copy relating to the extracted part of task processing;

a route switch instruction for switching the transmission route of the copy data relating to the extracted part of task processing to an other one of the communication lines different from said route switch object communication line is reported to said center storage device and said remote storage device;

said center storage device and said remote storage device are configured to receive the report of said route switch instruction so that the execution of the extracted part of task processing is started again to restart the remote copy, and said center computer includes a task priority management table for use in determining priority of task processing, said task priority management table including fields of task priority, task identifiers, hardware identifiers, load upper limit values, load lower limit values and copy type.

6. The center computer as defined in claim 5, wherein each of said center storage device and said remote storage device includes a journal for storing history information of a write operation of information to its own, and said center computer is configured to synchronize the journal of said remote storage device with the journal of said center storage device and to report said route switch instruction when it reports said route switch instruction.

7. The center computer as defined in claim 5, wherein said center computer is configured to serially extracts task processing having lower priority set in advance to the task processing when extracting a part of the task processing from among the task processing relating to the copy data transmitted through said route switch object communication line extracted.

8. A remote copy method in a remote copy storage device system including a center computer for executing a plurality of task processing; a center storage device connected to said center computer, for storing information obtained as a result of execution of said task processing by said center computer; and a plurality of remote storage devices connected to said center storage device through a plurality of communication lines, respectively, for receiving and storing copy data transmitted by said center storage device;

wherein at least one of said center computer and said center storage device includes a load measurement module for measuring load information of each of the plurality of communication lines connecting said center storage device and said plurality of remote storage devices, wherein said method comprises the steps of:

acquiring, by said center computer via said load measurement module, load information of each of the plurality of communication lines respectively connecting said center storage device and said plurality of remote storage devices;

extracting from among said communication lines, by said center computer, one of the communication lines, if it is determined by the load measurement module that the acquired load information of said one of the communication lines exceeds a predetermined threshold value, as a route switch object communication line;

extracting, by said center computer, a part of task processing from among task processing, said part of task processing relating to the copy data transmitted through the one of the communication lines extracted as said route switch object communication line;

stopping, by said center computer, execution of the extracted part of task processing to stop the remote copy relating to the extracted part of task processing;

reporting, by said center computer, a route switch instruction for switching the transmission route of the copy data relating to the extracted part of task processing to an other one of the communication lines different from said route switch object communication line to said center storage device and said remote storage device;

receiving, by said center storage device and said remote storage device, the report of said route switch instruction and then switching the transmission route of said copy data; and starting, by said center computer, execution of the extracted part of task processing to restart the remote copy wherein , said center computer includes a task priority management table for use in determining priority of task processing, said task priority management table including fields of task priority, task identifiers, hardware identifiers, load upper limit values, load lower limit values and copy type.

9. The remote copy method as defined in claim 8, wherein each of said center storage device and said remote storage device includes a journal for storing history information of a write operation of information to its own, and said center computer is configured to synchronize the journal of said remote storage device with the journal of said center storage device and to report said route switch instruction when it reports said route switch instruction.

10. The remote copy method as defined in claim 8, wherein said center computer is configured to serially extracts task processing having lower priority set in advance to the task processing when extracting a part of the task processing from among the task processing relating to the copy data transmitted through said route switch object communication line extracted.

11. The remote copy method as defined in claim 8, wherein said other communication line different from said route switch object communication line is a communication line connecting one of said remote storage devices connected to said route switch object communication line and an other one of the remote storage devices different from said one remote storage device.

* * * * *